Feb. 20, 1945.  J. A. REYNIERS  2,369,981
MICRO PHOTO APPARATUS
Filed April 22, 1942 4 Sheets-Sheet 1

INVENTOR.
JAMES A. REYNIERS.
BY Oltsch & Knoblock
Attorneys.

Feb. 20, 1945.  J. A. REYNIERS  2,369,981
MICRO PHOTO APPARATUS
Filed April 22, 1942   4 Sheets-Sheet 2

INVENTOR.
JAMES A. REYNIERS.
BY Oltsch & Knoblock
Attorneys.

Feb. 20, 1945.   J. A. REYNIERS   2,369,981
MICRO PHOTO APPARATUS
Filed April 22, 1942   4 Sheets-Sheet 3

INVENTOR.
JAMES A. REYNIERS.
BY Oltsch & Knoblock
Attorneys.

INVENTOR.
JAMES A. REYNIERS.
BY Oltsch & Knoblock
Attorneys.

Patented Feb. 20, 1945

2,369,981

UNITED STATES PATENT OFFICE 2,369,981

MICROPHOTO APPARATUS

James A. Reyniers, Niles, Mich.

Application April 22, 1942, Serial No. 439,990

5 Claims. (Cl. 88—24)

This invention relates to improvements in microphoto apparatus, and more particularly to apparatus by means of which a plurality of small images may be photographically recorded in a regular geometric arrangement upon a flat film, and by which a selected image on such a film may be placed in register with a lens for projection upon a screen to be viewed.

Current practice of microphotography entails the use of strip film for microcopy. Images are generally recorded on the strip in one row extending longitudinally of the film, and the film may be of any length necessary to record the images to be grouped together. This practice has various disadvantages, including difficulty in handling and storing the film and in locating a particular image on the film to which reference is desired. The use of microfilm by libraries, banks, brokerage offices, government departments, etc., for conveniently recording items, such as rare books, cancelled checks, purchase orders, legal papers, etc., makes the facility and rapidity of locating individual images on the film a matter of greatest importance to the successful use of the microfilm.

For the purpose of convenience in handling and filing or storing and also in locating images, I propose to utilize a flat film of substantially card size upon which a plurality of images may be recorded in rows wherein the images are aligned both longitudinally and transversely of the film. Such a film is illustrated in my co-pending patent application, Ser. No. 391,904, filed May 5, 1941.

It is the primary object of my invention to provide a novel device by means of which a plurality of images may be successively and automatically recorded on a film in predetermined uniformly spaced relation.

A further object is to provide a device of this character provided with means for automatically advancing a film step-by-step in a zigzag or sinuous path with reference to the lens system of a camera or of a reader or viewer.

A further object is to provide a device of this character having a film carriage with means for automatically advancing a film step by step in a predetermined path, means for rendering said advancing means inoperative, and means for shifting said carriage independently of said advancing means.

A further object is to provide a device of this character with film advancing means including a plurality of operating mechanisms, an electrical control unit including a plurality of parallel circuits each controlling one of said mechanisms, and circuit selecting switches controlled by said mechanisms for controlling the operating sequence of said circuits and mechanisms to effect movement of said film advancing means in a predetermined path.

A further object is to provide a device of this character having a film carriage and means for shifting said film carriage step by step in a path extending back and forth across the device.

A further object is to provide a device of this character having means for advancing a film mounting carriage step by step in longitudinal direction, means for shifting the film carriage transversely one step when the same reaches each end of its longitudinal movement in the device, and means controlled by said last named means for reversing the direction of longitudinal movement of the film carriage at each end of its longitudinal movement in the device.

A further object is to provide a device of this character having a movable film carrier, means for engaging and accurately positioning a film in said carrier for accurate focusing of a fixed lens thereon, and means actuated automatically upon movement of the carrier for momentarily shifting said first means to inoperative position spaced from said film.

A further object is to provide a device of this character wherein a film is shifted step by step with reference to a lens system, with means for accurately and precisely positioning the portion of the film adjacent the lens system to insure proper focus of the lens relative to the film.

Other objects will be apparent from the description, drawings, and appended claims.

Referring to the drawings, which illustrate the preferred embodiment of the invention, the numeral 10 designates a film advancing means mounted on a hollow standard 11 which includes a base 12 and upright walls 13. One of the upright walls 13 may have an opening 14 therein through which material to be photographed may be inserted into the housing for support on the base 12. Where the device is to be used as a reader or viewer, it will be understood that a screen (not shown) may be positioned upon the base 12 to be viewed through the opening 14.

The film advancing means 10 preferably comprises a housing 15 open at its bottom and having a slot 16 in one end thereof through which a film holder may be inserted within the device. A substantially cylindrical housing portion 17 preferably provided with radial cooling fins 18 projects from the top of the housing to mount a conventional light bulb 19 adapted to be energized when the device is used as a reader. Switch 20 is mounted on the housing and serves to control the light bulb 19. An extension cord 21 projects from the housing 15 and mounts a switch 22 for control of the film advancing means.

The construction of the film advancing mechanism 10 is best illustrated in Figs. 3 to 7, inclusive. A rectangular frame is fixedly mounted horizontally within the housing 15 at a level slightly below the slot 16. The frame comprises front bar 23, rear bar 24 and longitudinal bar 25 each preferably positioned in engagement with a vertical wall of housing 15, and longitudinal bar 26 spaced from the remaining wall of the housing. A plate 27 of a length to span the end bars 23 and 24 of the frame, is provided with transverse guides 28 projecting from its bottom adjacent its ends. Plate 27 is of a width approximately one half the width of the housing 15 and is shiftable transversely of the housing guided by the sliding engagement of the outer edges of the guides 28 with the frame members 23 and 24. At its opposite sides the plate 27 is provided with longitudinal guides 29 projecting upwardly therefrom. Plate 27 is provided with an elongated transverse opening 30 therein positioned directly below the bulb 19. A transverse member 31 depends from plate 27 intermediate its ends and spaced from opening 30. Transverse member 31 carries a transverse horizontal rack 32.

Figure 4:
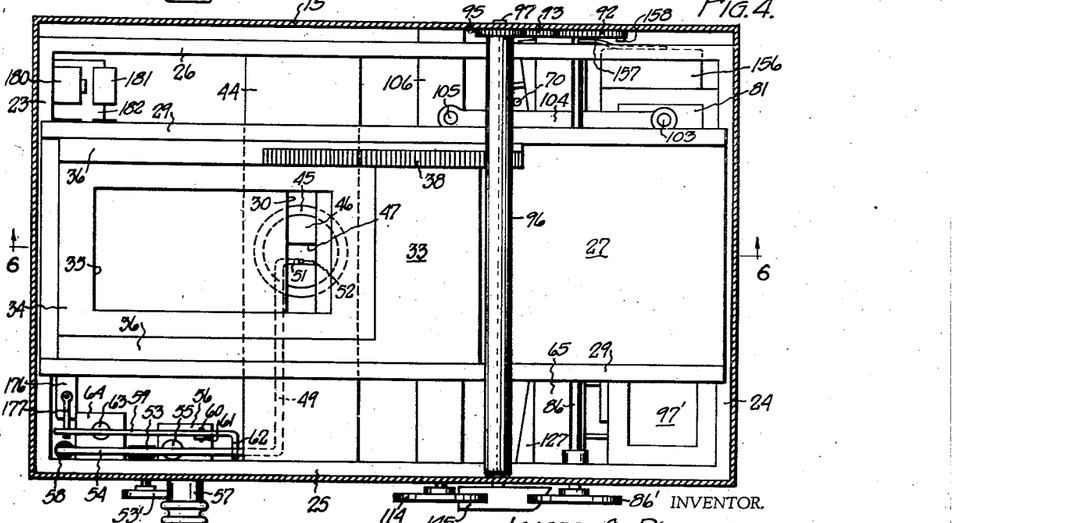
Fig. 4 is an enlarged horizontal sectional view similar to Fig. 3 with the film carriage in operative relation in the device.

A film carriage 33 is longitudinally shiftable upon the plate 27. Carriage 33 comprises a base plate 34 having an opening 35 therein of substantially the dimension of the film to be used with the device. As best shown in Fig. 4 this opening is preferably rectangular and the width thereof is equal to the length of the elongated passage 30 in the plate 27. Guides 36 extend longitudinally at the opposite sides of base plate 34 and project upwardly therefrom for sliding engagement with the guides 29 of the base plate 27. At their upper ends the guides 36 are provided with inwardly projecting ribs 37 adapted to slidably receive a suitable film holder. An elongated rack 38 is carried by one of the guides 36 and extends longitudinally thereof.

Figure 6:
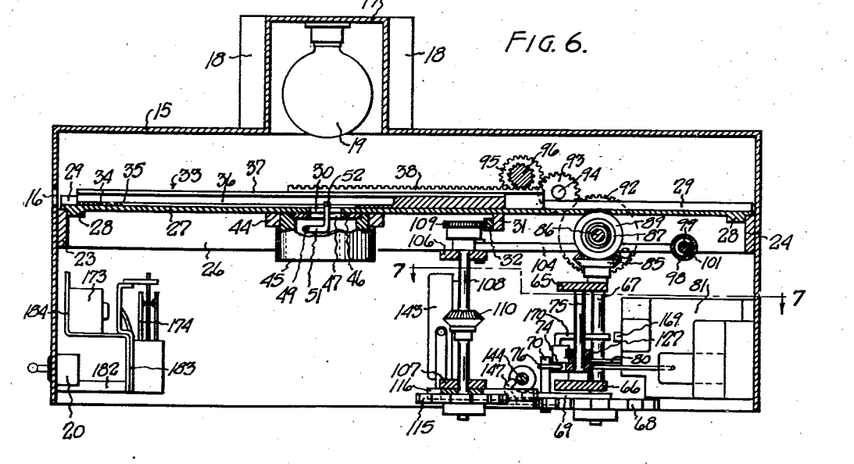
Fig. 6 is a longitudinal vertical sectional view of the device taken on line 6—6 of Fig. 4.
Figures 7, 9:
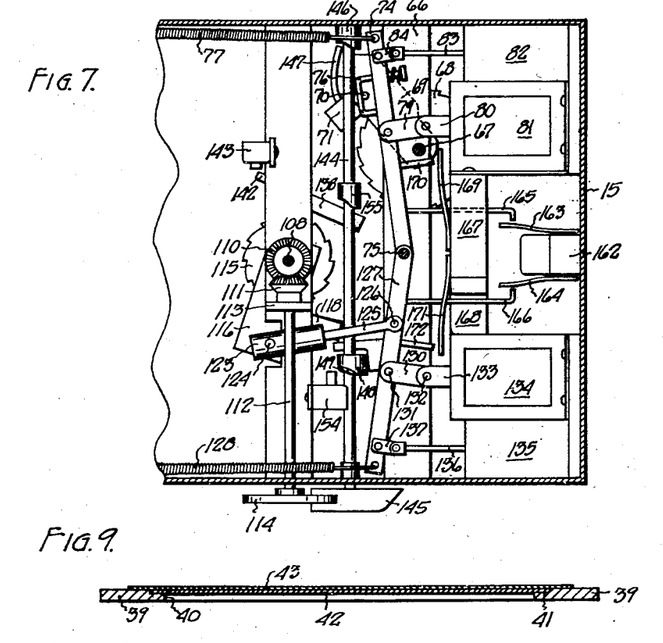
Fig. 7 is a fragmentary horizontal sectional view taken on line 7—7 of Fig. 6.
Fig. 9 is a sectional view of a film holder.

Any suitable film holder may be mounted in the film carriage 33. An illustrative film holder is shown in Fig. 9, and comprises a rectangular marginal frame 39 having an opening 40 therein of the same size as the opening 35 in carriage 33. The inner margin of the frame is stepped at 41 to support the margin of a film 42 spanning the opening 40 and positioned between the planes of the opposite faces of the frame. Film 42 will best serve if provided with an emulsion of fine grain capable of recording minute details. A backing sheet 43 is marginally secured or adhered to the frame member 39. The frame member 39 is preferably of a thickness to fit snugly between the base 34 and ribs 37 of carriage 33. It will be understood that the slot 16 is so positioned in housing 15 that a film holder as illustrated in Fig. 9 may be inserted in the film carriage 33 when that carriage is positioned adjacent the slot 16, as illustrated in Figs. 4 and 6.

A wide flat plate 44 extends transversely between the longitudinal frame members 25 and 26. Plate 44 has a screw threaded opening formed therein in substantially coaxial relation to the light bulb 19, and adapted to removably mount a suitable lens mount 45 whose upper edge preferably bears slidably on the lower face of the plate 27. Lens mount 45 is preferably adjustable for focusing purposes, as is well understood in the art. Within the upper end of the lens mount 45 is removably mounted a plate 46 having a restricted opening 47 therein which registers with the opening 30 in plate 27. It will be understood that a number of plates 46 may be provided for use with the device, each having an opening 47 of a different size than the others. The openings 47 determine the size of the images to be recorded on the film when the device is used as a camera, but may be slightly larger than said image for purposes to be set forth, if the object to be photographed is mounted on a black background provided on base 12.

Lens mount 45 has an opening therein adapted to rotatably receive a rod 49 journaled in bearings 50 carried by the bottom face of plate 44, and extending transversely of the device. The portion of rod 49 within the lens mount 45 is bent perpendicularly inwardly to provide a normally horizontal arm 51, and its inner end is bent upwardly to provide a film-engaging finger 52. Finger 52 passes through the opening 47 in plate 46 at one side thereof, and also through opening 30 in plate 27 and opening 35 in film carriage 33 for bearing engagement with film 42 alongside the film portion upon which the image of the object to be photographed is recorded. The outer end of rod 49 terminates adjacent one side of the housing 15, and said rod is bent to provide arm 54 extending toward the front of said housing. Intermediate its ends, arm 54 bears upon the plunger 55 of a micrometer 56 adjusted by a hand knob 57 extending exteriorly of the housing 15. A coil spring 58 is connected with the forward end of arm 54 and extends downwardly therefrom for connection with the lower portion of the housing 15. Spring 58 serves to position the arm 54 firmly into engagement with the plunger 55 of micrometer 56 to accurately adjust the position of film engaging finger 52. An elongated lever 59 is pivoted at 60 to a lug 61 projecting upwardly from the housing of the micrometer 56. Lever 59 extends in substantially parallel spaced relation to arm 54 and terminates at its inner end in a perpendicular arm 62 underlying arm 54. Lever 59 is connected with the plunger 63 of a solenoid 64 at its outer end. It will be observed that when the solenoid 64 is energized to shift its plunger 63 downwardly, the lever 69 is tilted about the point 68 to raise the arm 62 thereof and thereby raise the arm 54 of rod 49 against the action of the spring 58. Thereupon, rod 49 is rotated to cause the finger 52 thereof within the lens mount to move bodily downwardly out of engagement with the film 42 to accommodate movement of the film to a new position. Thus, finger 52 normally presses the film firmly against the backing sheet 43 of the film holder to accurately position it for proper focus thereon of the lens in the lens mount. Also, the action of the finger 52 pressing upon the film insures that the portion of the film exposed and in register with the opening 47 is held in flat position to prevent distortion of the images when recorded. If desired, a cam 53 may be journaled in the housing 15 for engagement with the arm 54 for tilting said arm independently of solenoid 64, to release finger 52, as when the film holder is applied and removed, and when the film carriage is manually adjusted.

A pair of transversely extending horizontal bars 65 and 66 are fixedly mounted within the housing 15 in vertical alignment spaced rearwardly from bar 44. The upper bar 65 is spaced below the lower level of the main frame 23—26, and the lower bar 66 is positioned adjacent the bottom edge of the housing. A vertical shaft 67 is journaled in the bars 65 and 66 and a ratchet wheel 68 is removably mounted on the lower end of said shaft and below the lower bar 66. An elongated arm 69 is pivoted at one end upon the shaft 67 and is positioned between the ratchet wheel 68 and the bar 66. A vertical stud 70 is carried by the free end of the arm 69 in spaced relation to the periphery of the ratchet wheel 68 and pivotally mounts at its lower end a pawl 71 which has a laterally projecting nose 72 adapted to engage the periphery of the ratchet wheel 68. A coil spring 73, secured at its opposite ends to the arm 69 and the pawl 71, serves to urge the nose 72 of pawl 71 into engagement with the ratchet wheel.

An elongated horizontal arm 74 extends transversely of housing 15 and is pivoted at its inner end upon a shaft 75 whose ends are secured to the bars 65 and 66 substantially centrally thereof. A U-shaped retainer 76 projects laterally from the arm 74 intermediate its ends and extends around the stud 70. An elongated coil spring 77 is connected at one end with the outer end of the arm 74 and at its opposite end to a pin 78 carried by housing 15 forwardly of bars 65—66. Intermediate its ends, the arm 74 is pivotally connected with a link 79 which is pivoted to the outer end of the armature 80 of a solenoid 81. Therefore, when the solenoid 81 is energized, the arm 74 is pivoted against the action of the spring 77, whereby the retainer 76 shifts the stud 70 to pivot the arm 69 and bodily move the pawl 71 for rotation of the ratchet wheel 68. The throw of the solenoid is of an extent to limit the movement of the arm 74 to that point necessary to advance the ratchet wheel 68 one step, that is, through an angle equal to the spacing between the teeth of the ratchet wheel. A dashpot 82 is positioned alongside the solenoid 81 and between the same and the outer wall of the housing. The stem 83 of the dashpot is connected by a link 84 with the outer end of arm 74. Hence, the movement of the parts is cushioned by the dashpot to avoid impacts or jarring of the parts which would otherwise occur, together with resultant vibration which would be detrimental to the proper operation of the device.

The upper end of the shaft 67 mounts a bevel gear 85 spaced above the cross bar 65. A transverse shaft 86 is journaled in the frame members 25 and 26 above the upper end of the shaft 67 and has a sleeve 87 slidable thereon and keyed thereto. Bevel gears 88 and 89 are formed at the opposite ends of the sleeve 87, and gear 85 is adapted to mesh with either of said gears 88 and 89 as selected by the position of sleeve 87. A stop 90 is fixed on the shaft 86 spaced from the sleeve 87, and an expansion coil spring 91 encircles shaft 86 and bears against the stop 90 and the end of sleeve 87 to normally urge the gear 89 to position meshing with gear 85. One end of shaft 86 extends outwardly of the housing 15, and mounts an indicating disc 86'. Adjacent its opposite end the shaft 86 mounts a gear 92 positioned within the housing 15 and between the housing and the frame member 26. Gear 92 meshes with a gear 93 mounted on a stud shaft 94 journaled in the housing wall. Gear 93 in turn meshes with gear 95 fixedly mounted on the end of an elongated gear 96 having studs 97 at its ends journaled in the opposite walls of housing 15. Gear 96 spans the housing 15 and meshes with the rack 38 of film carriage 33.

From the above it will be observed that on actuation of the solenoid 81, the ratchet wheel 68 is rotated one step by means of the arm 69 and the pawl 71. This partial rotation of ratchet wheel 68 similarly rotates shaft 67 and gear 85, one of the gears 88 and 89, shaft 86, gear train 92, 93, and 95, and gear 96, to advance the rack 38 and film holder 33 longitudinally of the housing 15.

The direction in which the shaft 86 and gears 92, 93, 95, and 96 are rotated, and the direction in which the rack 38 and the film carriage 33 are moved depends on which of the gears 88 and 89 mesh with the gear 85. The position of gears 88 and 89 is controlled by a solenoid 97' mounted within the housing 15. A cylinder 98 is mounted on the end of the plunger of said solenoid. An arm 99 extends into cylinder 98 and has a head 100 within said cylinder upon which an expansion coil spring 101 presses. The outer end of the cylinder 98 has an inturned flange 102 against which the opposite end of the spring 101 engages to normally urge the arm 99 in the direction of the solenoid 97'. Arm 99 has pivoted thereto at 103 a longitudinally extending arm 104 which is pivoted at 105 to a transverse bar 106 positioned forwardly of the bars 65 and 66. The inner edge of the bar 104 bears against the outer face of the gear 88. Thus, when the solenoid 97' is actuated to pull its core inwardly, the arm 99 serves to pivot the bar 104 and slide the sleeve 87 against the action of spring 91 to bring the gear 88 into mesh with the gear 85. Thus, assuming that the gear 85 normally meshes with the gear 89, it will be observed that actuation of the solenoid 97' serves to shift gear 88 into mesh with gear 85, and thereby reverse direction of the rotation of the shaft 86 and its associated gears for the purpose of reversing the direction of movement of the film carriage 33.

A transverse horizontal bar 107 spans the housing 15 adjacent the lower end thereof and directly below the bar 106. Bars 106 and 107 journal a vertical shaft 108 which mounts a gear 109 at its upper end above the bar 106. Gear 109 meshes with the transverse rack 32 projecting below the transversely slidable plate 27 of the film carriage. Intermediate its ends the shaft 108 mounts a bevel gear 110 which in turn meshes with a bevel gear 111 carried by a shaft 112 and extending horizontally and transversely of the housing 15. One end of the shaft 112 is journaled in an upright 113 carried by cross bar 107, and the opposite end of shaft 112 extends through and is journaled in the housing 15 and mounts an indicating disc 114 exteriorly of said housing.

At its lower end shaft 108 fixedly mounts a ratchet wheel 115. One end of an elongated plate 116 is pivoted on shaft 108 between ratchet wheel 115 and bar 107. Plate 116 in turn pivotally mounts a pair of pawls 117 and 118 about axis 119. Springs 120 are connected at one end to the plate 116 and at their opposite ends to the pawls 117 and 118. The nose projections 121 of pawl 117 and 122 of pawl 118 are spaced apart whereby, when one thereof engages one of the teeth of ratchet wheel 115, the other will be positioned intermediate said teeth. Springs 120 urge the pawls 117 and 118 into engagement with the ratchet wheel 115.

A cylinder 123 is pivoted to plate 116 at 124 and contains a coil spring encircling one end of a rod 125 having a head against which said spring bears to normally urge the rod 125 inwardly of said cylinder. Rod 125 is pivoted at 126 to an arm 127 pivoted on shaft 75 and extending transversely in the housing in opposite relation to arm 74. The outer end of arm 127 is connected with an elongated coil spring 128 which is connected to a stud 129 secured to one of the side walls of the housing 15 forwardly of bar 107. Arm 127 has a link 130 pivoted thereto at 131 and in turn pivotally connected at 132 to the stem 133 of a solenoid 134. A dashpot 135 is positioned alongside solenoid 134, and stem 136 of said dashpot is pivotally connected by link 137 with the outer end of arm 127.

Therefore, it will be observed that upon each operation of the solenoid 134, the arm 127 will be pivoted rearwardly, thereupon pivoting the plate 116 through the interconnecting spring cylinder and rod assembly 123, 125. The angular throw of the plate 116 is equal to substantially one half the angular displacement between adjacent teeth of the ratchet wheel 115. Thus, assuming that the nose 121 of the pawl 117 has been engaged with a tooth of ratchet wheel 115 during the movement of plate 116, the wheel 115 will be advanced thereby to a position wherein, upon return of plate 116 to normal inoperative position, the nose 122 of pawl 118 will bear against the shoulder of the next adjacent counter-rotational ratchet tooth.

A pawl 138 is pivoted at 139 to bar 107 at the side of the ratchet wheel 115 opposite the pawls 117—118. Pawl 138 has a spring 140 connected therewith and in turn connected with the bar 107 for normally urging the nose 141 of said pawl into engagement with the periphery of the ratchet wheel 115. Pawl 138 is provided with a projection 142 which extends adjacent a switch 143. The pawl 138 is so positioned relative to switch 143 that as the ratchet wheel 115 is advanced one half step by each operation of solenoid 134, its nose will alternately rest on the large and small diameter portions of the teeth of the ratchet wheel. Hence, the pawl projection 142 will alternately engage and disengage the switch 143 to alternately open and close the same. Switch 143 serves to control solenoid 97' for the purpose of controlling the position of gear sleeve 75 and the direction of rotation of shaft 86 and associated parts.

Figure 5:
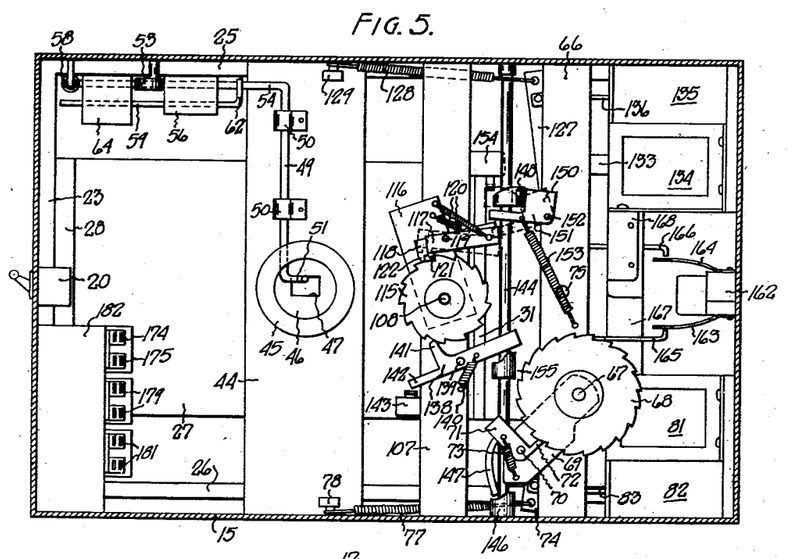
Fig. 5 is a bottom plan view of the film advancing means.

A shaft 144 extends transversely of and is journaled in the opposite walls of housing 115 between the pairs of bars 65, 66 and 106, 107. One end of the shaft 144 projects through the housing wall and mounts a hand piece 145. Shaft 144 mounts a plurality of cams. A cam 146, having an end cam surface, is adapted for engagement on rotation of 180° from normal position, with a finger 147 carried by pawl 71. Thus, referring to Fig. 5, which shows the operative position of the parts, it will be observed that the finger 147 is normally spaced from the cam 146 to permit free play of the pawl 71, and spring pressed engagement thereof with the ratchet wheel 68. When cam 146 is rotated 180°, it will bear upon the end of finger 147 and longitudinally displace the same against action of spring 73, whereby the nose 72 of said pawl is held in a position clear of the ratchet wheel 68. This permits free rotation of the shaft 86 by means of the indicia disc 86' for the purpose of adjusting the longitudinal position of the film carriage 33 within the housing. A disc 148 is eccentrically mounted upon the shaft 144 adjacent the pawls 117 and 118 and is provided with an end cam surface 149. Member 148 is normally positioned as illustrated in Fig. 5 for engagement with a shoulder 150 on a locking lever 151 which is pivoted at 152 to bar 66. Upon 180° rotation of shaft 144, the locking lever 151 is swung to the dotted line position illustrated in Fig. 5 by spring 153 which is connected thereto at one end and to the bar 66 at the other end. In its dotted line position, the locking lever 151 engages the free ends of pawls 117 and 118 to swing the same to the dotted line position in Fig. 5 against the action of the springs 120, thereby releasing pawls 117 and 118 from the ratchet wheel 115. Thus, shaft 108 may be freely rotated in one direction by manipulation of the indicating disc 114 on shaft 112, for the purpose of adjusting the transverse position of the plate 27 within the housing 15. A switch 154 is suitably mounted on the bar 107 for engagement by cam 148 when the shaft 144 is in releasing position for the purpose of breaking the operating circuit of the device. A disc 155 is mounted on the shaft 144 adjacent the pawl 138 and has an end cam surface adapted, upon rotation of shaft 144 to releasing position, for engagement with said pawl to hold the same clear of the ratchet wheel 115. Hence, it will be observed that rotation of the shaft 108 by wheel 114 is accommodated in either direction without interference from pawls 117, 118, and 138.

A switch 156 is positioned above the dashpot 82 and has a spring contact arm 157 which extends adjacent to but spaced from the inner face of the gear 92. Spring arm 157 is so positioned as to be engaged by an eccentrically positioned projection 158 on the inner face of the gear 95 for engagement and actuation of the spring arm 157 of switch 156 once during each complete 360° rotation of the gear 92. A switch 159 is mounted on the rear wall of the housing 15 adjacent the cylinder 98. Switch 159 has a spring arm 160 adapted for engagement by projection 161 upon the cylinder 98 when said cylinder is in retracted position during the time solenoid 97' is energized. Below the switch 159 and substantially centrally of the rear wall of the housing 15 is mounted a switch 162 which has a pair of spring arms 163 and 164 projecting forwardly therefrom at opposite sides thereof. An elongated longitudinally extending arm 165 has an inturned end portion normally spaced from the spring arm 163. Arm 165 is rigidly carried by the pivoted arm 74, whereby operation of arm 74 serves to shift arm 165 into engagement with spring 163 of switch 162. A similar elongated arm 166 is fixedly carried by pivoted arm 127 and terminates adjacent the spring 164 of switch 162, whereby, upon operation of arm 127, arm 166 engages the spring 164 of switch 162. A pair of switches 167 and 168 are dispositioned transversely between the inner ends of the solenoids 81 and 134 in superimposed longitudinally staggered relation. Switch 167 has a spring 169 extending longitudinally therefrom and positioned adjacent an arm 170 projecting laterally from pivoted arm 74, whereby arm 170 engages switch arm 169 of switch 167 on actuation of solenoid 81. Switch 168 has a longitudinally projecting spring arm 171 extending opposite the end of an arm 172 carried by pivoted arm 127, whereby, upon operation of solenoid 134 to pivot arm 127, the arm 172 engages the spring 171 of the switch 168.

On the front wall of the housing 15 is mounted a relay coil 173 controlling a pair of switches 174 and 175. A switch 176 is mounted adjacent solenoid 64 and has a spring arm 177 projecting adjacent the end of lever 59 for engagement by said lever upon actuation of said solenoid 64. A relay coil 178 is mounted on the front wall of the housing 15 and controls a double pole, single throw switch 179. Relay coil 180 is mounted adjacent the front wall of the housing and controls a double pole, single throw switch 181. Each of the relays 173, 178 and 180 and their associated switches is mounted on a suitable base 182 carried by the front wall of the housing and including upright switch-supporting plate portion 183 and coil-supporting portion 184.

Figures 1, 8:
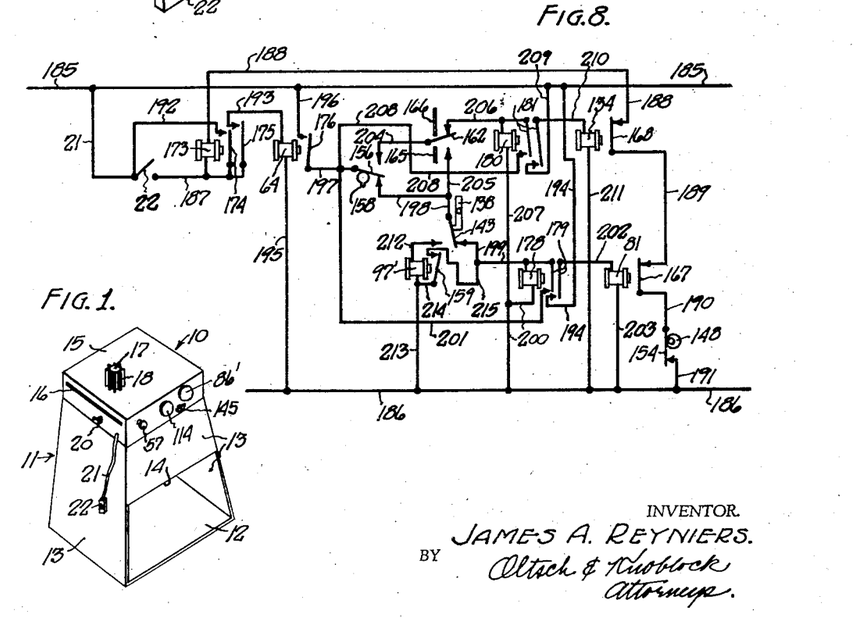
Fig. 1 is a perspective view of one embodiment of my invention.
Fig. 8 is a wiring diagram of the device.
Figure 2:
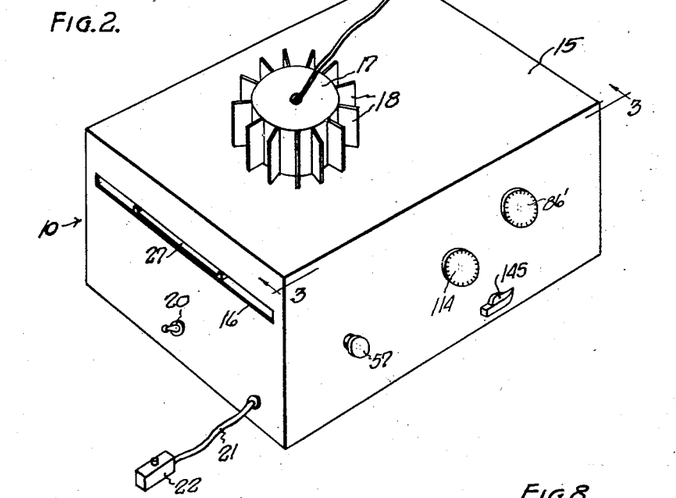
Fig. 2 is an enlarged perspective view of the film advancing means.
Figure 3:
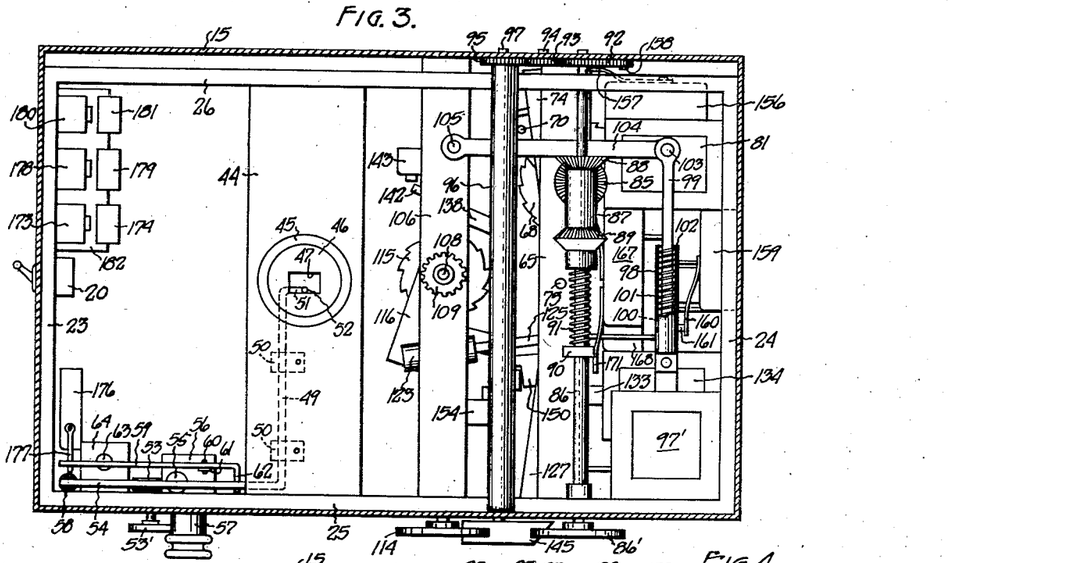
Fig. 3 is an enlarged horizontal sectional view taken on line 3—3 of Fig. 2, with the film carriage removed.

Referring to Fig. 8 which illustrates the wiring diagram of the device, the lines are designated 185 and 186. Extension cord 21 carrying control switch 22 leads from line 185, and a line 187 from switch 22 extends to relay 173. A lead 188 extends from relay 173 to normally closed switch 168. A lead 189 connects normally closed switch 168 in series with normally closed switch 167. A lead 190 connects normally closed switch 167 in series with normally closed switch 154. A lead 191 extends from switch 154 to line 186. Switches 174 and 175 associated with relay 173 are connected with lead 187. A by-pass lead 192 extends from lead 21 to the normally open terminal of switch 174. A lead 193 extends from the normally open terminal of switch 175 to solenoid 64. A lead 195 extends from solenoid 64 to line 186. A lead 196 extends from line 185 to the normally open terminal of switch 176, and a lead 197 extends from switch 176 to single pole, double throw switch 156. The normally closed terminal of switch 156 is connected by lead 198 with single pole, double throw switch 143. The normally closed terminal of switch 143 is connected by lead 199 with relay coil 178. Lead 200 connects relay coil 178 with line 186. Double pole, single throw switch 179 associated with coil 178 is connected with lead 199. One terminal of switch 179 is connected by lead 201 with line 197. The other terminal of switch 179 is connected by lead 194 with line 185. Switch 179 is connected by lead 202 with solenoid 81, which in turn is connected with line 186 by lead 203.

The normally open terminal of switch 156 is connected by lead 204 with single pole, double throw switch 162. One terminal of switch 162 is connected by lead 205 with lead 198. The other terminal of switch 162 is connected by lead 206 with relay coil 180, which in turn is connected by lead 207 to lead 200. Double pole, single throw switch 181 associated with coil 180 is connected with lead 206. One terminal of switch 181 is connected by lead 208 with lead 197. The other terminal of switch 181 is connected by lead 209 with line 185. Lead 210 extends from switch 181 to solenoid 134, which in turn is connected by lead 211 with line 186.

The normally open terminal of switch 143 is connected by lead 212 with solenoid 97', which in turn is connected by lead 213 with line 186. A lead 214 branches from lead 213 to switch 159. A lead 215 extends from the normally open terminal of switch 159 to lead 199.

The use and operation of the device is as follows:

Assuming that a film holder 39 has been inserted in the film carriage 33, the film carriage 33 and the plate 27 are first set in starting position, that is, a position wherein the upper right hand corner of the film as viewed in Fig. 4, is disposed in register with the restricted opening 47 of the lens mount 45. The object which is to be the subject of the first microphoto is placed on a suitable black background on the base 12, and suitable lights (not shown) within the standard 11 are energized. The shutter operator (not shown) of the camera, which will preferably be associated with the lens mount 45 in the manner well understood in the art, is then actuated to record a microphotograph of the object upon the film 42 at the corner portion thereof. Thereupon, the switch 22 is energized for the purpose of shifting the film to expose to the lens system through the restricted opening 47 the film portion upon which the next image is to be recorded. Referring to Fig. 8, it will be observed that closing of switch 22 energizes relay coil 173 to close the switches 174 and 175. Switch 174 closes the circuit through by-pass lead 192, and switch 175 closes a circuit through lead 193, solenoid 64, and lead 195 to line 186. Actuation of solenoid 64 closes the switch 176 to establish a circuit from line 185 through lead 196, switch 176, line 197, single pole, double throw switch 156 which normally is closed at the terminal connected with lead 198, which is connected with single pole, double throw switch 143, which is normally closed at the terminal connected with lead 199, which is connected with relay coil 178, and lead 200, to line 186. Actuation of relay coil 178 serves to close the double pole, single throw switch 179 to by-pass the relay coil 178 at line 201, and to close a circuit from line 185 through lead 194 to lead 202, solenoid 81, and lead 203, to line 186. Actuation of solenoid 81 serves to open the normally closed switch 167 in the line connecting relay coil 173 with line 186 and consisting of lead 188, switch 168, lead 189, switch 167, lead 190, switch 154, and lead 191.

Actuation of solenoid 81 pivots the arm 74 rearwardly against the action of spring 77, and shifts with it the stud 70 engaged by retainer 76 on said arm. The movement of stud 70 pivots the arm 69 and shifts the pawl 71 engaging the ratchet wheel 68 to advance the ratchet wheel 68 one step, i. e., through an angle equal to the angle between adjacent teeth of said wheel. This partial rotation of ratchet wheel 68 partially rotates shaft 67 and gear 85. The partial rotation of gear 85 is transmitted to that one of the gears 88—89 on sleeve 87 which meshes with gear 85.

which will be assumed to be gear 89, to rotate said shaft 86, indicator disc 86', and gear 92. Gear 92 drives gears 93 and 95 to rotate gear 96 which meshes with rack 38 on film carriage 33, thereby advancing said film carriage and the film therein to a position spaced from and longitudinally aligned with the first microimage recorded on the film 42. It will be observed that the operation of solenoid 81 causes arm 170 projecting from arm 74 to engage the spring contact 169 of normally closed switch 167 to break the operating circuit and deenergize coil 173, so that accidental repetition of operation of the device is positively prevented. Also, arm 165 engages projection 163 of switch 162 to maintain said switch in the position illustrated in Fig. 8. Thereupon, the camera shutter may be actuated to photograph another object which has been placed on base 12.

The sequence of operations above described continues or is repeated each time control switch 22 is closed until one complete row of photographs has been recorded longitudinally along one side of film 42. When the last position in the row is reached, cam projection 158 upon gear 92 will engage the arm 157 of single pole, double throw switch 156. Thereupon the next succeeding actuation of switch 22 serves to close the circuit, upon operation of solenoid 64, from line 185 through lead 196, switch 176, lead 197, switch 156, lead 204, switch 162, lead 206, relay coil 180 and leads 207, and 200, to line 186. The actuation of relay coil 180 serves to close double pole, single throw switch 181 to by-pass coil 180 through line 208, and to close a circuit from line 185 to line 209, switch 181, line 210, solenoid 134, and line 211, to line 186.

Actuation of the solenoid 134 pivots the arm 127 rearwardly against the actuation of spring 128, to pull upon arm 125 associated with spring cylinder 123, and thereby pivot arm 116. The pivotal movement of arm 116 rotates the ratchet wheel 115 one-half step through the medium of that one of the pawls 117 and 118 which is in driving engagement with a tooth of the ratchet wheel. The shaft 108 is rotated through the same angle as ratchet wheel 115, and serves to rotate both the indicating disc 114 and the gear 109. Rotation of the gear 109 laterally shifts the plate 27 through the medium of the rack 32 on said plate which meshes with said gear, so that the device is ready for recording of the first photograph in a new longitudinal row upon the film on the next operation of the shutter. It will also be observed that, as arm 127 is pivoted, the arm 172 which projects therefrom engages the projection 171 of normally closed switch 168 to open the same. At the same time, rod 166 engages the arm 164 of switch 162 to reverse its position from that illustrated in Fig. 8.

The partial rotation of shaft 108 pivots the pawl 138 whose nose 141 rides on the teeth of ratchet wheel 115. Thus, assuming that the ratchet wheel 115 has moved, from the position illustrated in Fig. 5, one-half step in a clockwise direction, the pawl nose 141 will then rest upon the peak of the adjacent tooth of said wheel and the pawl 138 will be pivoted for engagement of the portion 142 thereof with the single pole, double throw switch 143. Pawl 138 thus shifts switch 143 into contact with the terminal with which lead 212 is connected. Also, it will be observed that gear 43 has not been rotated by the preceding operation of the device by solenoid 134, so switch 156 remains in engagement with the terminal connected with line 204. Hence, the parts are so arranged that upon the next operation of the control switch 22, and solenoid 64, the circuit established will be as follows: Line 185, lead 196, switch 176, lead 197, switch 156, lead 204, switch 162, leads 205 and 198, switch 143, lead 212, solenoid 97', and lead 213, to line 186. Operation of solenoid 97' closes the branch circuit from lead 213 through lead 214, switch 159, leads 215 and 199, relay coil 178, and lead 200, to line 186. Operation of coil 178 in turn closes the circuit to solenoid 81. The operation of solenoid 97' pulls on rod 99 to pivot arm 104 and thereby longitudinally shift the sleeve 87 on shaft 86 to the position illustrated in Fig. 3 wherein gear 88 meshes with gear 85. Thus, since the gear 88 is rotated by gear 85 in a direction opposite that in which gear 89 is rotated when meshing with gear 85, the film carriage 33 will be shifted in a direction opposite its first series of movements. The first operation of gear 92 following each operation of solenoid 134, shifts the cam projection 158 on said gear 92 away from the arm 157 of switch 156, whereupon, the switch 156 again assumes a position in engagement with the terminal connected with lead 198. It will also be observed that the pivotal movement of arm 74 has caused the arm 165 to engage the switch 162 and reset said switch in engagement with the terminal connected with lead 206. Ratchet wheel 115 remains stationary during the series of operations of the device required to complete the second longitudinal row of images, so that the pawl 138 will continue to hold the switch 143 in engagement with the terminal thereof connected with lead 212 until cam projection 158 of gear 92 again engages arm 157 of switch 156 to shift the same into engagement with the terminal thereof connected with lead 204 for the purpose of closing a circuit to solenoid 134, as will be understood.

The electrical control of the device thus automatically effects selective operation of the solenoids 81, 134 and 97', upon successive actuations of the control switch 22 to shift the film step by step in the device in a path which defines a plurality of laterally spaced longitudinal rows of images.

The solenoid 64 performs an important function in the device in addition to the operation of switch 176. Thus, on each operation of said solenoid 64, the lever 59 which is connected therewith is pivoted to cause its arm 62 to engage and pivot the arm 54 of rod 49 to lower the film engaging finger 52 against the action of spring 58. Thus, during movement of film 42 by the device, the finger is held spaced therefrom to avoid scratching of the film. When the solenoid 64 is deenergized, the spring 58 returns the finger 52 to operative film-engaging position. The finger 52 is positioned just outside of the area of the film upon which the lens is focused, so that the finger does not interfere with the recording of the image, and at the same time serves to accurately space the film from the lens for focusing purposes, and to hold the portion of the film on which the lens is focused in true flat position pressed against the backing sheet 43.

When a complete series of photographs has been recorded on the film, the operating hand grip 53' for the cam 53 is rotated to manually shift the arm 54 against spring 58 and release the finger 52 from the film. Also, the hand piece 145 is rotated 180°. Rotation of the hand piece 145 rotates the shaft 144, whereby the cam surface engages and shifts the finger 147 to pivot the cam pawl 71 to inoperative disengaged relation to the ratchet wheel 68. The rotation of shaft 144 also causes the cam disc 155 to engage the pawl 138 and shift it to inoperative position relative to ratchet wheel 115. Likewise, the rotation of the shaft 144 rotates the cam 148 to open the switch 154 and to shift the locking lever 151 to a position engaging and pivoting pawls 117 and 118 out of engagement with the ratchet wheel 115. Thus, the manipulation of members 53' and 145 completely releases each of the operating and film-engaging parts of the device, whereby the discs 86' and 114 may be manipulated to return the film carriage to its starting position, and to permit removal and replacement of the film holder 39 without interference from finger 52.

The use of the device as a camera for recording images upon a film has been mentioned at length herein, but it will be understood that the device may also be used as a reader or viewer with very little change. For use as a reader, a suitable screen (not shown), preferably inclined, is mounted on the base 12 in a position to be readily viewed through the opening 14. A film holder 39 having its backing sheet 43 removed is mounted in the film carriage 33, and is positioned with the proper or desired image of the film 42, in register with the lens system, by manipulating the discs 86' and 114. It will be understood that the cam 53 will likewise be positioned to disengage the finger 52 from the film during the operation of adjusting the film to proper reading position. Light bulb 19 is then energized and the selected image is projected on the screen.

In order to facilitate the location of individual images on film 42 for reading purposes, each of the indicating discs 86' and 114 is provided with a plurality of indicia at its margin which serve to indicate the longitudinal and transverse positions, respectively, of the film carriage 33 in the film holder. These indicia also serve, when the device is used as a camera, to indicate the position of the film with reference to the lens system, and hence the number of images which have been recorded on the film.

Figure 10:
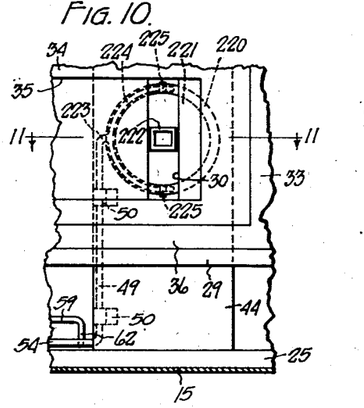
Fig. 10 is a fragmentary plan view of a modified embodiment of film-engaging member.
Figure 11:
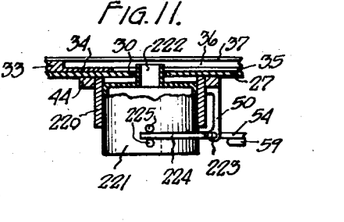
Fig. 11 is a fragmentary vertical sectional view of the film-engaging member taken on line 11—11 of Fig. 10.

Another embodiment of the focusing or film-engaging portion of the invention is illustrated in Figs. 10 and 11. In this embodiment the bar 44 has a central circular opening in which is fixedly mounted a vertically extending cylindrical guide sleeve 220. A cylindrical lens mount 221 is slidable within the sleeve 220 in a guided movement. The upper end of lens mount 221 is provided with a tubular projection 222 of rectangular cross section. Projection 222 normally projects freely through the opening 30 in plate 27 and the opening 35 in film holder 33, with its upper edge engaging with the film 42 at the margin of the portion on which the micro image is to be recorded. Rod 49 is journaled in bearings 50 carried by and projecting downwardly from the bottom of the bar 44 below the lower edge of the guide sleeve 220. Rod 49 is bent perpendicularly at 223 and terminates in a yoke portion 224 which fits around the lens mount 221. A pair of vertically spaced pins 225 are carried by the lens mount 221 at each of two diametrically opposed points, and the ends of the yoke portions 224 extend between said pins. It will be observed that operation of the lever 59 by solenoid 64 will serve the purpose of shifting the arm 54 of rod 59 to lower yoke 224 and thereby lower the lens mount 221 and disengage projection 222 from the film. This construction has the advantage that the film is engaged continuously around the area upon which the image is to be recorded to give assurance that the part of film on which the lens system is focused will be in true flat condition. Also, the projection 222 serves to reduce the area of the film which is subject to exposure upon each shutter operation. This embodiment may be micrometically adjusted for accurate positioning of the portion 222 by operation of the micrometer 56 as in the preferred embodiment.

While it will be customary in the use of apparatus of this character for the user to standardize upon a given size of micro image to be recorded on the film 42, it is possible to vary that size within a wide range. For this purpose, ratchet wheels 68 and 115 are preferably removably mounted on the shafts 67 and 108, respectively, so that there may be substituted therefor other ratchet wheels having a greater or lesser number of teeth. Also, a plurality of discs or plates 46 may be provided, each having a different size opening 47.

I claim:

1. Microphoto apparatus comprising a housing, a lens system carried by said housing, a film carriage juxtaposed to said lens system and including a pair of relatively shiftable parts, a pair of solenoids, means connecting each solenoid with one of said parts and actuable step by step by said solenoid, a control circuit having a control switch and a plurality of selector switches controlled by said connecting means, said solenoids being connected in said circuit in parallel, said selector switches controlling the selection of a single solenoid to be energized upon each operation of the control switch and the sequence of operation of said solenoids upon successive operations of said control switch.

2. Microphoto apparatus comprising a housing, a lens system carried by said housing, a support shiftable in said housing, a rack carried by said support, a gear meshing with said rack, a film carrier shiftable on said support, a rack carried by said carrier, an elongated gear meshing with said rack, a pair of mechanisms each rotating one of said gears a predetermined extent upon each operation thereof, a pair of solenoids for actuating said mechanisms, a control circuit including a control switch and a plurality of selector switches actuated by said mechanisms in a predetermined sequence, said solenoids being connected in said circuit in parallel for operation of a selected one only upon each actuation of said control switch and according to said predetermined sequence.

3. Microphoto apparatus comprising a housing, a lens system carried by said housing, a support shiftable in said housing, a rack on said support, a gear journaled in said housing and meshing with said rack, a film carrier shiftable on said support, a rack on said carrier, an elongated gear journaled in said housing and meshing with said last-named rack, a pair of actuators, a pair of mechanisms each connecting an actuator with a gear and including a ratchet wheel having a driving connection with a gear and a pawl engaging said ratchet wheel and operable by an actuator, a controller, and means associated with said controller and controlled by said mechanisms in a predetermined sequence for energizing one actuator only upon each operation of said controller.

4. Microphoto apparatus comprising a housing, a lens system carried by said housing, a support shiftable in a fixed path in said housing, a film carrier shiftable in a fixed path on said support, a pair of actuators, a mechanism connecting said carrier with one actuator and including direction-reversing gearing, mechanism connecting said support with the other actuator and including a ratchet wheel rotatable upon each actuation of said mechanism through an angle equal to one-half the angular displacement of the teeth of said wheel, a normally open control circuit, means in said circuit controlled by said mechanisms for selectively connecting said actuators in said circuit in a predetermined sequence as said circuit is successively closed, a pivoted member engaging the toothed periphery of said wheel, and means in said circuit controlled by said pivoted member for controlling said direction-reversing gearing.

5. Microphoto apparatus comprising a housing carrying a lens mount, a film carriage shiftable in a plane adjacent one end of said lens mount, means for shifting said carriage step by step in a reciprocating path, means for shifting said carriage step by step in one direction only transversely of said path, a control circuit, a pair of solenoids connected in parallel in said circuit and respectively connected with said carriage shifting means, a primary selector switch in said circuit normally closing said circuit to the solenoid connected with said first named shifting means, said switch being controlled by said first shifting means, a second selector switch interposed in said circuit between said first switch and the other solenoid and connected with said first solenoid at its normally open terminal, said second switch being controlled by both shifting means, and means for controlling the direction of operation of said first shifting means including a switch controlled by said second shifting means and interposed in said circuit between said first switch and first solenoid.

JAMES A. REYNIERS.

Patent No. 2,369,981                                          Granted February 20, 1945

JAMES A. REYNIERS

The above entitled patent was extended November 27, 1951, under the provisions of the act of June 30, 1950, for 292 days from the expiration of the original term thereof.

*Commissioner of Patents.*